(12) United States Patent
Carreira

(10) Patent No.: US 9,415,827 B2
(45) Date of Patent: Aug. 16, 2016

(54) MOTORCYCLE GUARD

(71) Applicant: Bernard K. Carreira, Orcutt, CA (US)

(72) Inventor: Bernard K. Carreira, Orcutt, CA (US)

( * ) Notice: Subject to any disclaimer, the term of this patent is extended or adjusted under 35 U.S.C. 154(b) by 132 days.

(21) Appl. No.: 14/092,656

(22) Filed: Nov. 27, 2013

(65) Prior Publication Data

US 2015/0145232 A1 May 28, 2015

(51) Int. Cl.
*B62K 25/02* (2006.01)
*B62J 23/00* (2006.01)
*B62K 21/02* (2006.01)

(52) U.S. Cl.
CPC ............... *B62K 25/02* (2013.01); *B62J 23/00* (2013.01); *B62K 21/02* (2013.01); *Y10T 29/49948* (2015.01)

(58) Field of Classification Search
CPC .. B62K 2025/041; B62K 19/40; B62K 21/02; B62J 23/00
USPC ........ 280/276, 277, 279, 288.4, 304.3, 152.1; 150/167; 293/105; D12/126
See application file for complete search history.

(56) References Cited

U.S. PATENT DOCUMENTS

| 2,773,398 | A | * | 12/1956 | Swain | B62M 25/00 |
| | | | | | 280/304.3 |
| 4,138,132 | A | * | 2/1979 | Doyle | B62J 23/00 |
| | | | | | 264/163 |
| 5,067,930 | A | | 11/1991 | Morales | |
| 6,082,479 | A | | 7/2000 | Storz | |
| 6,659,489 | B2 | | 12/2003 | Masui et al. | |
| 7,066,857 | B1 | | 6/2006 | DeRosa | |
| D567,150 | S | * | 4/2008 | Woodin | D12/126 |
| 7,637,520 | B2 | | 12/2009 | Madden | |
| 7,793,963 | B2 | * | 9/2010 | Sloan | B62K 19/44 |
| | | | | | 280/152.3 |
| 8,172,050 | B2 | | 5/2012 | Mikura et al. | |
| 8,833,784 | B2 | * | 9/2014 | Moechnig | B62K 19/30 |
| | | | | | 280/275 |
| 2007/0235986 | A1 | | 10/2007 | Weagle | |

(Continued)

FOREIGN PATENT DOCUMENTS

| JP | S51-138848 U | 4/1975 |
| JP | H02-216382 A | 8/1990 |
| JP | H22-3157567 U | 2/2010 |

OTHER PUBLICATIONS

Topar Offroad Products; Front Fork Guard for 07-14 Kawasaki/KX250F/KX45OF; http://cdn1.bigcommerce.com/server4500/d707d/products/132/images . . . ; Sep. 4, 2013.

(Continued)

*Primary Examiner* — Anne Marie Boehler
(74) *Attorney, Agent, or Firm* — Fitch, Even, Tabin & Flannery LLP

(57) ABSTRACT

A plurality of protective cover assemblies and methods for protecting the front brake-side axle clamp and the front non-brake-side axle clamp of a motorcycle. A brake-side plastic cover plate is shaped to cover the brake-side axle clamp and brake caliper support and is coupled to the brake-side axle clamp utilizing existing brake-side axle clamp pinch bolt holes. A non-brake-side plastic cover plate is shaped to cover the non-brake-side axle clamp and is coupled to the non-brake-side axle clamp utilizing existing non-brake-side axle clamp pinch bolt holes. The cover assemblies deflect and absorb impact forces that would otherwise impact the axle clamps and the brake caliper support.

9 Claims, 9 Drawing Sheets

(56) References Cited

U.S. PATENT DOCUMENTS

2008/0191444 A1     8/2008     Stahel et al.
2009/0051140 A1     2/2009     Saguchi

OTHER PUBLICATIONS

Bullet Proof Designs; KTM / Husaberg Bullet Proof Front Disc Guard; https://www.bulletproofdesigns.com/products/type/disk-guards/bullet-proof-designs-front-discguard.html; downloaded Feb. 14, 2014; 1 page.

Flatland Racing; KTM Front Disc Protector 03-14 all 125-530 except LC4, also fits 09-14 Husaberg; http://www.flatlandracing.com/Merchant2/merchant.mvc?Screen=PROD&Store_Code=FR&Product_Code=13-12&Category_Code=Front+Disc+Guard-downloaded Feb. 14, 2014; downloaded Feb. 14, 2014; 1 page.

Cycra Racing; Factory Disc Covers Item# 109X-XX; http://store.cycraracing.com/fadico.html; downloaded Feb. 14, 2014; 1 page.

\* cited by examiner

MOTORCYCLE GUARD

BACKGROUND OF THE INVENTION

1. Field of the Invention

The present invention relates generally to motorcycle accessories, and more specifically to impact protector motorcycle accessories. Even more specifically, the present invention relates to motorcycle accessories protecting the front fork from impact.

2. Discussion of the Related Art

Vehicles are generally exposed to exterior impacts from road or off-road conditions. For example, debris may be located on a roadway or impact a vehicle after being struck by an adjacent vehicle. Depending on the nature of the impact material and type of impact, damage to the vehicle may be superficial or structural.

Off-road motorcycles are typically driven in conditions where impacts to the motorcycle are common. As a result, many types of guards are found in the art to protect various parts of a motorcycle against impact.

One commonly guarded motorcycle part is the front brake disc. The front brake disc is a disc mounted to the front wheel on one side, and is part of the motorcycle braking system. Numerous examples of front brake disc guards are found in the prior art. A front brake disc guard is typically mounted to the lower end of the front fork on the disc brake side, and covers the outer side of the front disc brake between the front side of the front fork and the front brake caliper mounted to the rear side of the front fork. The front brake disc guard is traditionally disc-shaped with a circular sector portion removed. The front brake disc guard may be mounted in a variety of ways, typically utilizing existing front fork, axle, or brake caliper bolts.

While front brake disc guards are generally designed to protect the front brake disc from impact and damage, the bottom ends of the front fork are also susceptible to damage sustained while riding. Some front disc brakes are designed to install from the side of the lower end of the front fork, then wrapping around the bottom of the lower end of the front fork before terminating in the disc guard shape.

SUMMARY OF THE INVENTION

Several embodiments of the invention advantageously address the needs above as well as other needs by providing a protective cover system for an axle clamp.

In one embodiment, the invention can be characterized as a protective cover system for an axle clamp, wherein the axle clamp is coupled to a front fork of a motorcycle, comprising: a cover plate shaped to cover and conform to at least a portion of an axle clamp outer surface, the axle clamp having a first pinch bolt hole and a second pinch bolt hole, the axle clamp outer surface portion located generally perpendicular to a motorcycle front wheel, the cover plate including an impact face facing outward from the axle clamp when the cover plate is coupled to the axle clamp, the cover plate having a first bolt hole located so that when the cover plate is coupled to the axle clamp, the first bolt hole is concentric to the first pinch bolt hole, the cover plate having a second bolt hole located so that when the cover plate is coupled to the axle clamp, the second bolt hole is concentric to the second pinch bolt hole, the cover plate comprising a resilient and flexible material, the cover plate including a cover plate width generally equal to an axle clamp width of the axle clamp in a direction generally perpendicular to the motorcycle front wheel when the cover plate is coupled to the axle clamp, the cover plate including a thickness configured for resisting breakage of the cover plate and protecting the axle clamp from damage when the cover plate sustains impact during use of the motorcycle, a first spacer, of generally cylindrical shape, and comprising a rigid material, with a first spacer longitudinal axis coinciding with a first bolt hole longitudinal axis, a first spacer upper portion extending through at least a portion of the first bolt hole and coupled to the cover plate, the first spacer including a first spacer length greater than the thickness, whereby a cover plate interior face at the first spacer is separated from an axle clamp outer face by a first spacer distance equal to the first spacing length when the first spacer is coupled to the axle clamp at the first pinch bolt hole; a second spacer, of generally cylindrical shape, and comprising a rigid material, with a second spacer longitudinal axis coinciding with a second bolt hole longitudinal axis, a second spacer upper portion extending through at least a portion of the second bolt hole and coupled to the cover plate, at the second hole location, and the second spacer including a second spacer length greater than the thickness, whereby the cover plate interior face at the second spacer is separated from the axle clamp outer face by a second spacer distance equal to the second spacing length when the second spacer is coupled to the axle clamp at the second pinch bolt hole; a first bolt including a first bolt head and a threaded first bolt shaft, the first bolt shaft passing through the cover plate at the first bolt hole, the first spacer, and the first pinch bolt hole, wherein the first bolt head is mounted on a first spacer end proximate to the impact face of the cover plate, and the first bolt is threadably coupled to a first axle clamp top pinch bolt hole and a first axle clamp bottom pinch bolt hole; a second bolt including a second bolt head and a threaded second bolt shaft passing through the cover plate at the second bolt hole, the second spacer, and the second pinch bolt hole, wherein the second bolt head is mounted on a second spacer end proximate to the impact face of the cover plate, and the second bolt is threadably coupled to a second axle clamp top pinch bolt hole and a second axle clamp bottom pinch bolt hole, whereby the cover plate is coupled to the axle clamp so that the impact face is adjacent to the axle clamp outer surface, whereby the cover plate sustains an impact and flexes to absorb the impact and contact the axle clamp to distribute the impact over an axle clamp contact surface, whereby impact damage to the axle clamp is reduced.

In another embodiment, the invention can be characterized as A method of making a protective cover system for an axle clamp, wherein the axle clamp is coupled to a front fork of a motorcycle, comprising the steps of: forming a cover plate comprising a resilient and flexible material, in a shape covering and conforming to at least a portion of an axle clamp outer surface, the axle clamp outer surface portion being generally perpendicular to a motorcycle front wheel, the cover plate including a first bolt hole and a second bolt hole, the cover plate comprised of a resilient and flexible material, the cover plate including a cover plate width generally equal to an axle clamp width of the axle clamp outer surface portion, the cover plate including a cover plate thickness configured for resisting breakage of the cover plate and protecting the axle clamp from damage when the axle clamp sustains impact during use of the motorcycle, the cover plate including an impact face facing outward from the axle clamp when the cover plate is coupled to the axle clamp; coupling a first spacer, wherein the first spacer is generally cylindrical, to the first bolt hole so that a first spacer portion extends through at least a portion of the first bolt hole, and a remainder of the first spacer extends outward from the cover plate face proximate to the axle clamp outer surface; coupling a second spacer, wherein the second spacer is generally cylindrical, to the cover plate at the second hole so that a portion of the second cylindrical spacer extends through at least a portion of the first bolt hole, and a remainder of the second spacer extends outward from the face of the cover plate proximate to the axle clamp outer surface; providing a first bolt including a first bolt head, and a first threaded bolt shaft, the axle clamp having a first pinch bolt hole and a second pinch bolt hole, the first bolt configured to be inserted in the first pinch bolt hole and threadably coupled to a first axle clamp top pinch bolt hole and a first axle clamp bottom pinch bolt hole, whereby the cover plate and the first spacer are coupled to the axle clamp; providing a second bolt including a second bolt head and a second threaded bolt shaft, the second bolt configured to be inserted in the second pinch bolt hole and threadably coupled to a second axle clamp top pinch bolt hole and a second axle clamp bottom pinch bolt hole, whereby the cover plate and the second spacer are coupled to the axle clamp, whereby the cover plate covers the axle clamp outer surface portion and flexes, whereby an at least one impact from an external source is resisted by resilience and flexure of the cover plate as it contacts the axle clamp outer surface portion.

In yet another embodiment, the invention can be characterized as a method of using a protective cover system for an axle clamp, wherein the axle clamp is coupled to a front fork of a motorcycle, and the axle clamp includes an axle clamp outer surface, comprising the steps of: coupling the protective cover system including a resilient and flexible cover plate, the cover plate having a first bolt hole and a second bolt hole and including a cover plate width, and the protective cover system including a first spacer and a second spacer, to the axle clamp, the axle clamp having a first pinch bolt hole and a second pinch bolt hole, wherein a first bolt including a first bolt head and an threaded first bolt shaft is threadably coupled to a first axle clamp top pinch bolt hole and a first axle clamp bottom pinch bolt hole after the first bolt is passed through the first bolt hole, the first spacer, and a second bolt including a second bolt head and a second threaded bolt shaft is threadably coupled to a second axle clamp top pinch bolt hole and a second axle clamp bottom pinch bolt hole after the first bolt is passed through the second bolt hole, the second spacer, whereby the axle clamp outer surface is covered by the cover plate, the cover plate generally following the axle clamp outer surface and including an impact face facing outward from the axle clamp when the cover plate is coupled to the axle clamp; sustaining an at least one external impact to the cover plate while operating the motorcycle, whereby the impact is absorbed by the cover plate flexing, whereby a cover plate surface portion proximate to the axle clamp contacts an axle clamp outer surface portion, whereby the impact is sustained without damage to the axle clamp.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
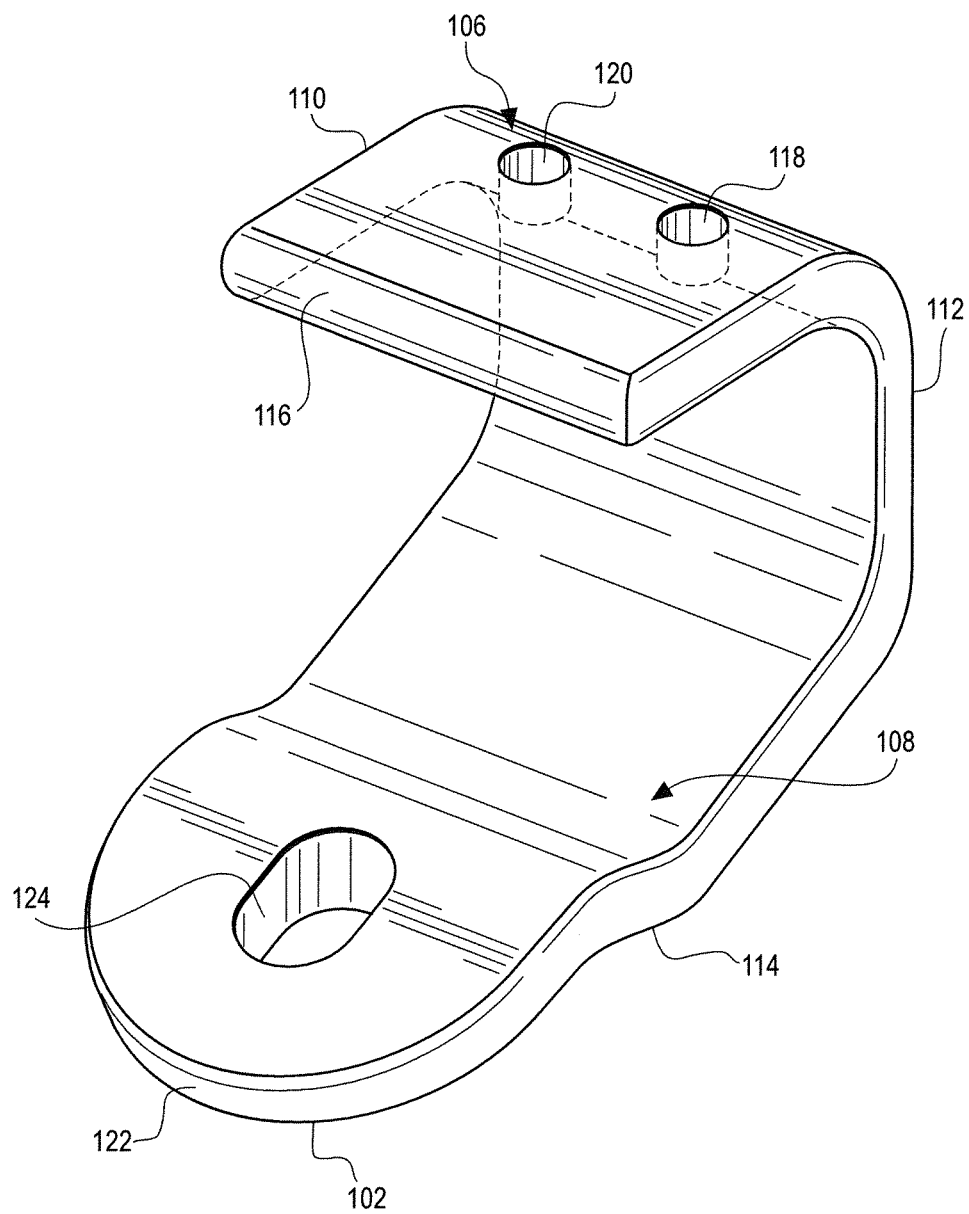
FIG. 1 is a perspective view of a cover plate of a protective cover assembly for a non-brake-side axle clamp of a motorcycle.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a perspective view of a non-brake-side cover plate 102 of a non-brake-side protective cover assembly 308 for a front fork non-brake-side axle clamp 810 (as shown below in FIG. 8) of a motorcycle is shown. Shown are a non-brake-side impact face 106, a non-brake-side axle clamp face 108, a non-brake-side top segment 110, a non-brake-side front segment 112, a non-brake-side bottom segment 114, a non-brake-side first edge 116, a first bolt hole 118, a second bolt hole 120, a non-brake-side second edge 122, and a non-brake-side access hole 124.

For the purposes of the description herein, the term front is generally defined as referring to the side of the motorcycle in the direction of forward travel, and the term rear is generally defined as the side of the motorcycle opposite to the direction of travel.

The non-brake-side protective cover assembly 308 and the brake-side protective cover assembly 1114 described herein are designed to provide protection to certain motorcycles manufactured by KTM. Those skilled in the art will note that the geometry of the cover assemblies 308, 114 may be modified to accommodate other makes and models of motorcycles.

In the embodiment shown, the non-brake-side cover plate 102 comprises a resilient and flexible material, for example, nylon, fiber-reinforced nylon, glass-reinforced nylon, acetal plastic, acrylic, ABS, epoxy, polycarbonate, HDPE, LDPE, polyethylene oxide, polyurethane, polyvinyl acetate, PVC, or any other suitably resilient and flexible material.

The non-brake-side cover plate 102 may be formed by any method suitable to form the shape of the non-brake-side cover plate 102 from the chosen material. Examples of forming methods include molding, thermoforming and computer numerical control.

The non-brake-side cover plate 102 is formed in a general reverse-C-shape, and includes a generally uniform thickness, where the thickness is defined as the in-plane width of the reverse-C-shape. The thickness of the non-brake-side cover plate 102 in the present embodiment is approximately 8 mm.

The width of the non-brake-side cover plate 102 is defined herein as the out-of-plane dimension of the reverse-C-shape. The width of the non-brake-side cover plate 102 corresponds generally to the width of the surface of the non-brake-side axle clamp 810 in a direction generally parallel to a front wheel axle 816 (as shown below in FIG. 8). In the present embodiment, the cover plate width is generally 50 mm. As the non-brake-side axle clamp 810 surface width may vary around the perimeter of the front wheel axle 816, the non-brake-side cover plate 102 width may also vary to follow the changes in the non-brake-side axle clamp 810 surface width.

The length of the non-brake-side cover plate 102 is defined herein as the perimeter length of the reverse-C-shape of the non-brake-side cover plate 102. The length of the non-brake-side cover plate 102 is in part determined by a length along the surface of the non-brake-side axle clamp 810, as measured in a direction generally parallel to plane of a motorcycle front wheel 818 (as shown below in FIG. 8), starting with the intersection of a motorcycle front fork 814 (as shown below in FIG. 8) and the non-brake-side axle clamp 810, continuing towards the front of the motorcycle, then following the underside of the non-brake-side axle clamp 810 towards the rear of the motorcycle and terminating at the intersection of the underside of the non-brake-side axle clamp 810 and the rear face of the non-brake-side axle clamp 810. The length of the non-brake-side cover plate 102 may optionally be extended to cover the rear face of the non-brake-side axle clamp 810. The length of the non-brake-side cover plate 102 in the embodiment as shown in FIG. 1 is approximately 108 mm.

The non-brake-side impact face 106 of the non-brake-side cover plate 102 is defined herein as the outer surface of the reverse-C-shape, and is equal to the non-brake-side cover plate 102 face distal to the non-brake-side axle clamp 810 when the non-brake-side protective cover assembly 308 is installed on the non-brake-side axle clamp 810 (as shown below in FIG. 8). The non-brake-side axle clamp face 108 is defined as the inner surface of the reverse-C-shape, equal to the non-brake-side cover plate 102 face proximate to the non-brake-side axle clamp 810 when the non-brake-side cover plate 102 is installed on the non-brake-side axle clamp 810.

The non-brake-side cover plate 102 is a single integral member, however, for purposes of description the length of the non-brake-side cover plate 102 has been defined as having three general segments: the non-brake-side top segment 110, the non-brake-side front segment 112, and the non-brake-side bottom segment 114. The non-brake-side segments 110, 112, 114 are described according to their position relative to the non-brake-side axle clamp 810 when the non-brake-side protective cover assembly is installed on the non-brake-side axle clamp 810, i.e. the non-brake-side top segment 110 is generally proximate to the top surface of the non-brake-side axle clamp 810, and the non-brake-side front segment 112 is generally proximate to the front surface of the non-brake-side axle clamp 810.

The non-brake-side top segment 110 extends linearly from the free non-brake-side first edge 116 of the non-brake-side cover plate 102 to the non-brake-side front segment 112. The non-brake-side first edge 116 is located proximate to the intersection of the front of the front fork 814 and the non-brake-side axle clamp 810 when the non-brake-side cover plate 102 is installed on the non-brake-side axle clamp 810. The non-brake-side top segment 110 includes the first bolt hole 118 and the second bolt hole 120 passing through the thickness of the non-brake-side cover plate 102. The first bolt hole 118 and the second bolt hole 120 are each located to align the hole 118, 120 centerline with the corresponding non-brake-side axle clamp 810 pinch bolt hole centerline when the non-brake-side protective cover assembly 308 is installed on the non-brake-side axle clamp 810 (as described below in FIG. 8). In the present embodiment, the first bolt hole 118 and the second bolt hole 120 are approximately 10 mm in diameter, with the center of each bolt hole 118, 120 located approximately 32 mm from the non-brake-side first edge 116. The distance between the center of the first bolt hole 118 and the center of the second bolt hole 120 is approximately 19 mm. Skilled artisans will note that the location of the first bolt hole 118 and the second bolt hole 120 will vary depending on the extent of the axle surface coverage of the non-brake-side top segment 110 of the non-brake-side cover plate 102 and the dimensions of the non-brake-side axle clamp 810.

The diameter of the first bolt hole 118 and the second bolt hole 120 varies across the thickness of the non-brake-side cover plate 102 in order to accommodate a plurality of spacers 202 and a plurality of bolts 300, 900, as shown below in FIGS. 2-9.

The non-brake-side front segment 112 is integrally coupled to the non-brake-side top segment 110 at an approximately right angle to the non-brake-side top segment 110, the actual angle matching the change in direction of the non-brake-side axle clamp 810 surface, with the non-brake-side front segment 112 extending downward from the non-brake-side top segment 110. In the embodiment shown, the intersection of the non-brake-side top segment 110 and the non-brake-side front segment 112 does not form a hard edge, but is curved to a radius of approximately 12 inches. The length of the non-brake-side front segment 112 is approximately 52 mm, generally corresponding to the front length of the non-brake-side axle clamp 810 surface. The non-brake-side front segment 112 extends linearly downward, away from the non-brake-side top segment 110, to the location where it is coupled to the non-brake-side bottom segment 114.

The non-brake-side bottom segment 114 is integrally coupled to the non-brake-side front segment 112 at an angle configured to match a contour of the non-brake-side axle clamp 810, in the present embodiment a radius of approximately 10 inches. The non-brake-side bottom segment 114 extends generally linearly for a length of approximately 79 mm. In the embodiment shown, the non-brake-side bottom segment 114 curves to follow the surface of the underside of the non-brake-side axle clamp 810. The non-brake-side cover plate 102 then terminates at the non-brake-side second edge 122.

The non-brake-side bottom segment 114 includes the non-brake-side access hole 124 located to align with the motorcycle compression damping adjustment screw 812 (as shown below in FIG. 8) located on the underside of the non-brake-side axle clamp 810. In the present embodiment, the non-brake-side access hole 124 is approximately 13 mm in diameter, and located approximately 22 mm from the non-brake-side second edge 122 of the non-brake-side cover plate 102. Those skilled in the art will note that the location of the non-brake-side access hole 124 in the non-brake-side cover plate 102 will vary depending on the make and model of the motorcycle.

In the embodiment shown, the non-brake-side second edge 122 of the non-brake-side cover plate 102 is shown in a generally semi-circular shape.

Referring again to FIG. 1, as previously described, the non-brake-side cover plate 102 is shaped in a general reverse-C shape. As shown below in FIG. 8, when the reverse-C shape is installed on the non-brake-side axle clamp 810, the non-brake-side cover plate 102 covers and protects the top, front and underside of the non-brake-side axle clamp 810. The simplicity of the reverse-C shaped non-brake-side cover plate 102 improves the ease of installation and maintenance of the non-brake-side protective cover assembly 308.

The non-brake-side cover plate 102 is comprised of plastic. The plastic material includes sufficient toughness to sustain external impact loads, such as would normally be encountered when using a motorcycle off-road, without causing fracture of the cover plate. The plastic material also retains sufficient deformability and flexibility to absorb the impact loads and dissipate them without sustaining damage to the non-brake-side axle clamp 810 (as shown below in FIG. 12). In addition, manufacturing the non-brake-side cover plate 102 of a plastic material reduces the additional weight added to the motorcycle when compared to a cover plate constructed of a metal material.

The thickness of the non-brake-side cover plate 102 is suitable for providing protection of the non-brake-side axle clamp 810, sustaining forces that arise due to impact of external objects on the non-brake-side cover plate 102 and providing sufficient mass to reduce excess vibration of the non-brake-side cover plate 102 during use, while simultaneously maintaining some flexibility of movement of the non-brake-side cover plate 102 relative to the non-brake-side axle clamp 810 when installed on the non-brake-side axle clamp 810. Those skilled in the art will note that the non-brake-side cover plate 102 thickness may vary to accommodate various conditions, such as varying sizes of the non-brake-side axle clamp 810.

The non-brake-side cover plate 102 width may vary, but is generally equal to the width of the non-brake-side axle clamp 810. The width of the non-brake-side cover plate 102 may vary as the width of the surface of the non-brake-side axle clamp 810 varies, or the non-brake-side cover plate 102 may include a constant width, where the width of the non-brake-side cover plate 102 is approximately equal to the maximum width of the non-brake-side axle clamp 810, for simplicity and ease of manufacturing.

As previously noted, the segments 110, 112, 114 of the generally reverse-C-shaped non-brake-side cover plate 102 include varied lengths and are coupled to each other at various angles. As shown below in FIG. 8, the non-brake-side cover plate 102 shape generally follows the profile of the non-brake-side axle clamp 810, In the embodiment shown, the non-brake-side cover plate 102 is shaped to conform to a KTM off-road motorcycle axle clamp, but it will be obvious to those skilled in the art that the non-brake-side cover plate 102 shape may be altered to conform to the non-brake-side axle clamp 810 of other makes of off-road motorcycles, for example, Beta, Husqvarna, Kawasaki, Honda, Husaberg, and Suzuki.

The non-brake-side bottom segment 114 includes the non-brake-side access hole 124, as noted previously. The non-brake-side access hole 124 allows a user to access and adjust the compression damping adjustment screw 812 located on the underside of the non-brake-side axle clamp 810. The non-brake-side access hole 124 allows for adjustment of the compression damping while the non-brake-side protective cover assembly 308 remains installed on the non-brake-side axle clamp 810.

Figure 2:
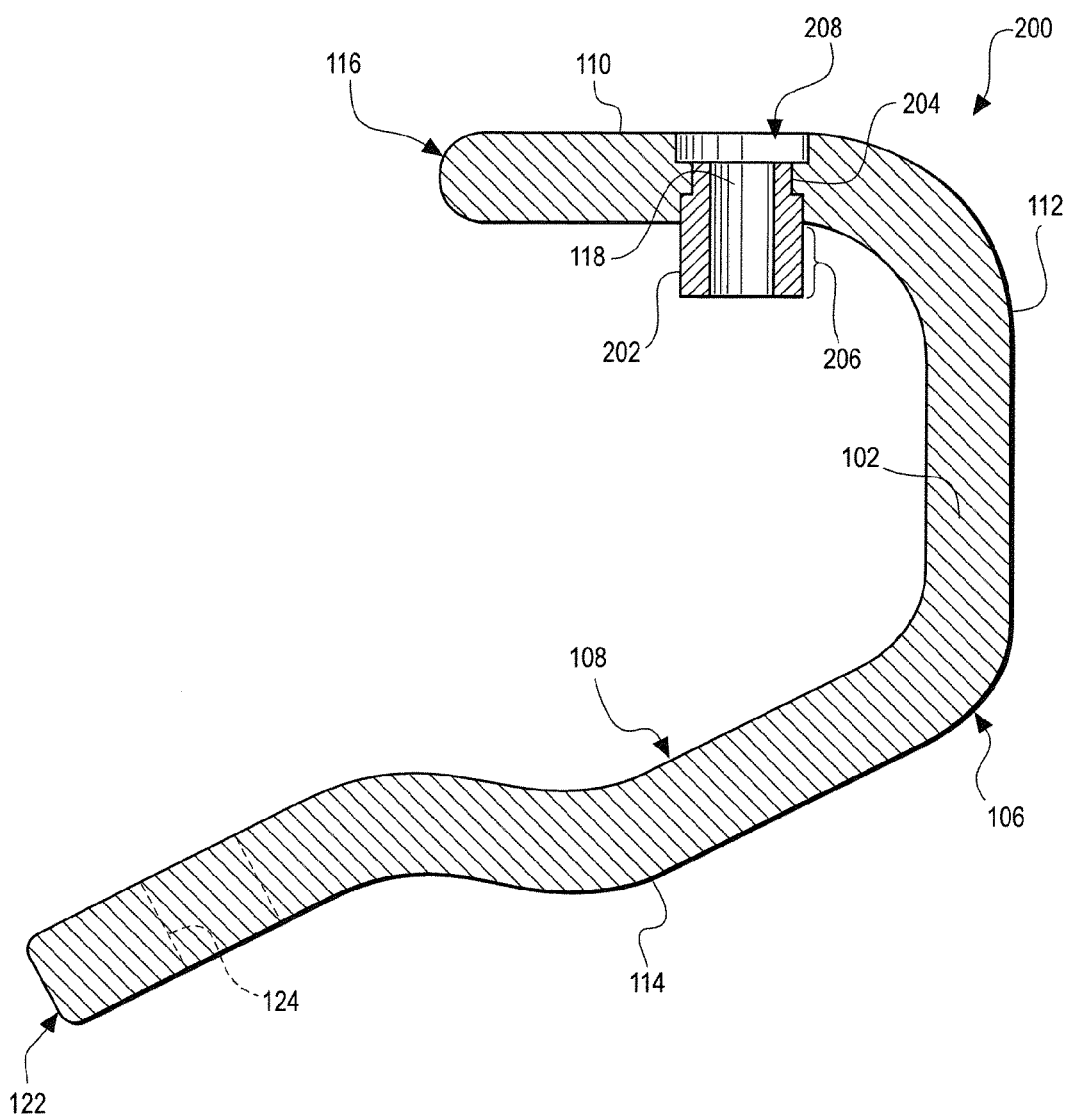
FIG. 2 is a cross-sectional view of a front cover plate and spacer assembly of the protective cover assembly for the non-brake-side axle clamp of the motorcycle.

Referring next to FIG. 2, a cross-sectional view of a non-brake-side cover plate and spacer assembly 200 through the first bolt hole 118 in accordance with one embodiment of the invention is shown. Shown are the non-brake-side impact face 106, the non-brake-side axle clamp face 108, the non-brake-side top segment 110, the non-brake-side front segment 112, the non-brake-side bottom segment 114, the non-brake-side first edge 116, the first bolt hole 118, the non-brake-side second edge 122, the non-brake-side access hole 124, the first spacer 202, a first spacer upper portion 204, a first spacer lower portion 206, and a first bolt recess 208.

The first spacer 202 is shown coupled to the first bolt hole 118. The first spacer 202 is of generally cylindrical shape, with a constant interior diameter and a varying exterior diameter. In the present embodiment the interior diameter of the first spacer 202 is approximately 0.32". The first spacer 202 may be integrally coupled or demountably coupled to the non-brake-side cover plate 102. In the embodiment shown, the first spacer is integrally coupled to the non-brake-side cover plate 102. The integral coupling may be accomplished by various means, for example, if the non-brake-side cover plate 102 is formed by molding, the first spacer 202 may be placed in the mold so that the non-brake-side cover plate 102 is formed around and coupled to the first spacer 202.

The first spacer 202 is comprised of a strong and rigid material including a large modulus of elasticity, and is resistant to atmospheric corrosion, such as aluminum or stainless steel.

The first spacer 202 is coupled to the non-brake-side cover plate 102 so that the upper portion 204 of the first spacer 202 exterior face is juxtaposed with the non-brake-side cover plate 102 at the interior of the first bolt hole 118. The lower portion of the first spacer 202 extends below the non-brake-side axle clamp 810 face and is coupled to the non-brake-side axle clamp 810, as shown below in FIG. 8.

The top of the first spacer 202 is proximate to the impact face of the non-brake-side top segment 110 of the non-brake-side cover plate 102.

In the present embodiment, the top of the first spacer 202 is located approximately 14 mm below the non-brake-side impact face 106. The first bolt recess 208 is located above the first spacer 202, so that the top of the first spacer 202 is exposed to above. The first bolt recess 208 configured to provide a seat for the first bolt head 302. The first spacer 202 includes a varying exterior diameter, as described further below in FIGS. 4-7.

The second spacer (not shown) is identical to the first spacer 202 and is coupled to the second bolt hole 120 in the same manner as the first spacer 202 is coupled to the first bolt hole 118.

Referring again to FIG. 2, the non-brake-side cover plate 102 is shown in conjunction with the first spacer 202 coupled to the first bolt hole 118. As noted previously, the second spacer (not shown) is identical to the first spacer 202 and is coupled to the second hole 120 in the same manner as the first spacer 202 is coupled to the first bolt hole 118.

The first spacer 202 provides a strong and rigid intermediate connection member for coupling the non-brake-side cover plate 102 to the non-brake-side axle clamp 810. As shown below in FIG. 8, the non-brake-side protective cover assembly 308 is coupled to the non-brake-side axle clamp 810 by using the bolts 300, 900 with each bolt having a bolt head 302 seated on the top of the spacers 202. The tightening of the bolts 300, 900 to secure the wheel axle 816 and the non-brake-side protective cover assembly 308 results in a substantial compressive axial force on the spacers 202, requiring a strong and minimally deformable material such as aluminum or stainless steel.

As previously shown, the first spacer 202 is coupled to the first bolt hole 118 and extends below the non-brake-side axle clamp face 108. When the non-brake-side cover plate 102 is installed on the non-brake-side axle clamp 810, the bottom of the first spacer 202 is coupled to a top surface of the non-brake-side axle clamp top portion 820, as shown below in FIG. 8. As the top surface of the non-brake-side axle clamp 810 may vary, for example as for the KTM axle clamp as shown in FIG. 8, the extension of the first spacer 202 below the non-brake-side cover plate 102 allows for the non-brake-side cover plate 102 to be offset from the non-brake-side axle clamp 810 top surface so that the non-brake-side cover plate 102 may be installed over the varying top surface.

Those skilled in the art will note that the first spacer 202 and the second spacer may be connected with a spacer connector such that the first spacer 202, the second spacer and the spacer connector forms a spacer assembly. The spacer connector would be configured to space the first spacer 202 and the second spacer apart at a distance for aligning the first spacer 202 and the second spacer with the bolt holes 118, 120 and the pinch bolt holes 824, 826 when the cover plate and spacer assembly 200 is coupled to the axle clamp 810.

Figure 3:
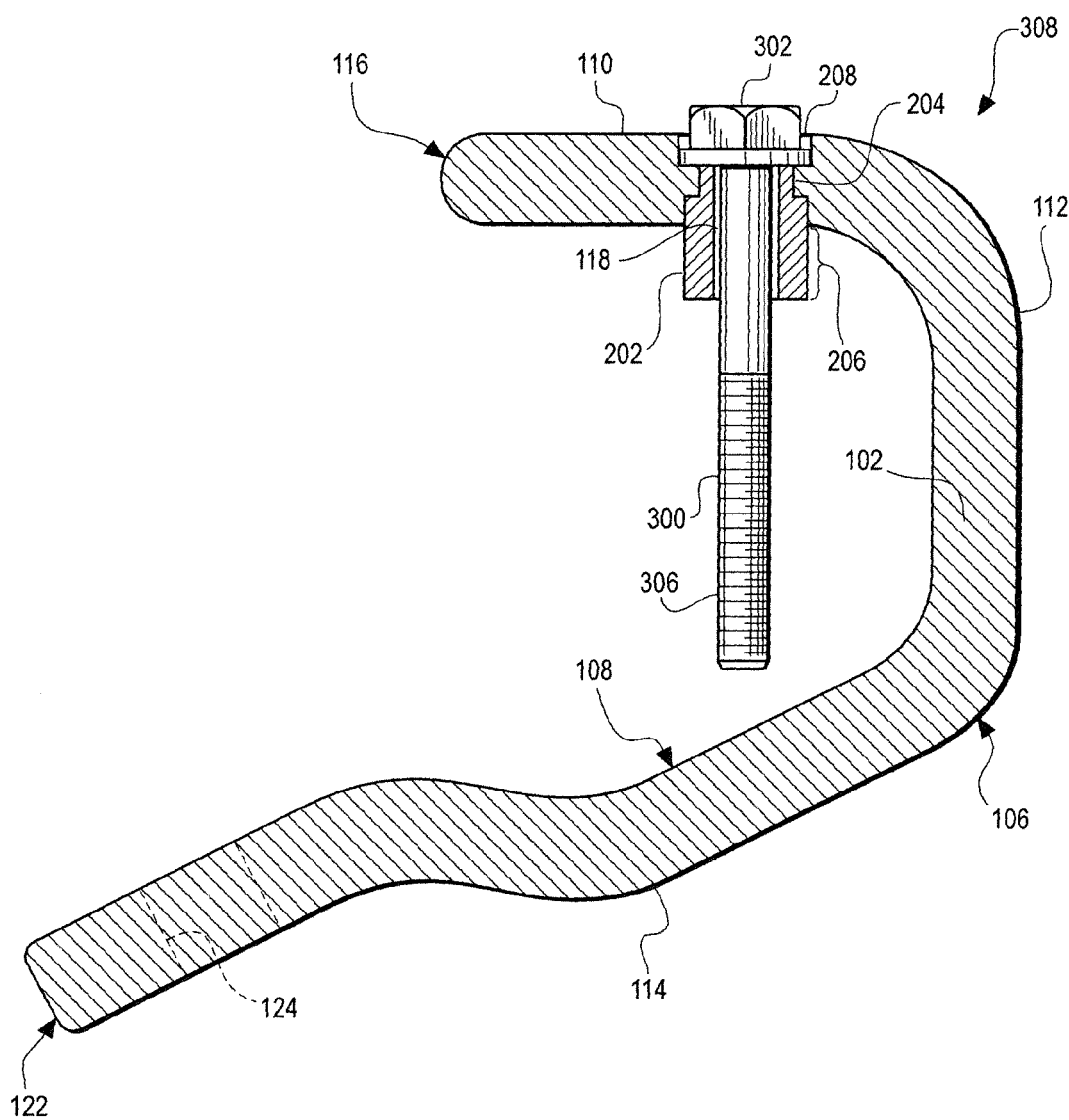
FIG. 3 is a cross-sectional view of the protective cover assembly for the non-brake-side axle clamp of the motorcycle.

Referring next to FIG. 3, a cross-sectional view of the non-brake-side cover plate 102 assembly through the first bolt hole 118 in accordance with one embodiment of the invention is shown. Shown are the non-brake-side impact face 106, the non-brake-side axle clamp face 108, the non-brake-side top segment 110, the non-brake-side front segment 112, the non-brake-side bottom segment 114, the non-brake-side first edge 116, the first bolt hole 118, the non-brake-side second edge 122, the non-brake-side access hole 124, the non-brake-side axle clamp face 108, the first spacer 202, the first spacer upper portion 204, the first spacer lower portion 206, the first bolt recess 208, the first bolt 300, the first bolt head 302, a first bolt head flange 304, and a first bolt shaft 306.

The non-brake-side cover plate and spacer assembly 200 as shown above in FIG. 2 is shown here with the addition of the first bolt 300. The first bolt 300 includes the first bolt head 302, the first bolt flange 304, and the first bolt shaft 306. The first bolt head 302 includes the integral annular first bolt head flange 304 located at the base of the first bolt head 302. The first bolt head 302 is seated on and bearingly coupled to the top face of the first spacer 202, with the first bolt shaft 306 passing through the first spacer 202 and extending past the non-brake-side axle clamp face 108 of the non-brake-side cover plate top segment 110.

The first bolt shaft 306 extends towards the non-brake-side axle clamp face 108 of the bottom segment 114, but does not extend beyond the outer surface of the non-brake-side axle clamp 810. In the embodiment shown for the KTM motorcycle, the first bolt 300 is a M8-1.25×45 bolt. The first bolt head 302 is a hex-type head, with a nominal diameter of approximately 14 mm.

When the non-brake-side protective cover assembly 308 is installed on the non-brake-side axle clamp 810, the first bolt shaft 306 is threadably coupled to the non-brake-side axle clamp 810, as shown below in FIG. 8.

As noted previously in FIG. 2, while the cross-section in FIG. 3 shows only the first spacer 202 and first bolt 300, configuration and operation of the second spacer and second bolt 900 are as shown for the first spacer 202 and first bolt 300 as shown in FIG. 3.

Referring again to FIG. 3, the first bolt 300 is coupled to the first spacer 202. The first bolt head 302 is mounted in the first bolt recess 208, providing additional restraint of motion of the non-brake-side cover plate 102 with respect to the first bolt 300. In an alternate embodiment the first bolt recess 208 may be eliminated, for example to reduce manufacturing expense, and restraint of motion instead provided, for example, by frictional contact between the first bolt head 302 and the impact face of the non-brake-side cover plate 102.

The embodiment shown includes the first bolt head flange 304 configured for providing an additional bearing surface for the first bolt head 302 bearing at the top surface of the first spacer 202.

The first bolt shaft 306 extends through the non-brake-side top segment 110 and the first spacer 202 for a length suitable for threadably coupling to the non-brake-side axle clamp 810 as shown below in FIG. 8. The first bolt shaft 306 length is configured such that an end of the first bolt shaft 306 does not extend past the outer surface of the non-brake-side axle clamp 810.

In the present embodiment, the first bolt head 302 includes a hex-type flanged head to conform with KTM motorcycle standards and allow for use of a standard KTM wrench to install the first bolt 300 on the non-brake-side axle clamp 810. Those skilled in the art will note that other types of bolt heads and sizes may be used to conform with other motorcycle manufacturer standards.

Figure 4:
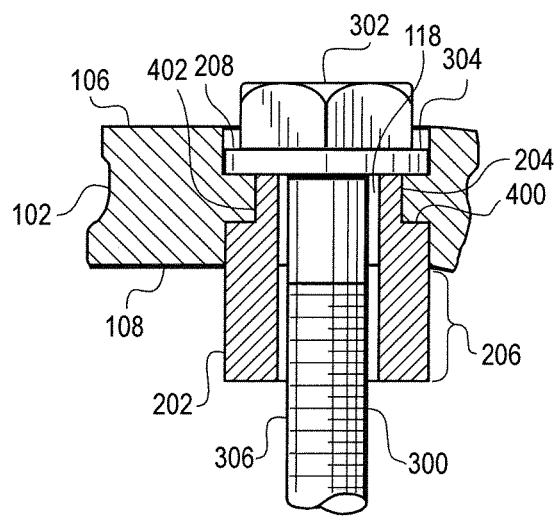
FIG. 4 is a cross-sectional detail view of one embodiment of a spacer installed as part of the protective cover assembly for the non-brake-side axle clamp of the motorcycle.

Referring next to FIG. 4, a detail of the cross-sectional view of the first spacer 202 as part of the non-brake-side protective cover assembly 308 in one embodiment of the invention is shown. Shown are the non-brake-side cover plate 102, the non-brake-side impact face 106, the non-brake-side axle clamp face 108, the first bolt hole 118, the first spacer 202, the first spacer upper portion 204, the first spacer lower portion 206, the first bolt recess 208, the first bolt 300, the first bolt head 302, the first bolt head flange 304, the first bolt shaft 306, a first spacer shoulder 400, and a spacer decreased thickness portion 402.

As previously noted, all description of the first components of the non-brake-side protective cover assembly 308 applies equally to the corresponding second components, of the non-brake-side protective cover assembly 308, i.e. the description of the first spacer 202 corresponds to the description of the second spacer, etc.

As previously described in FIGS. 1-3, the first spacer 202 is coupled to the non-brake-side cover plate 102 to provide a rigid seat for mounting the first bolt 300 and to offset the non-brake-side cover plate 102 from the non-brake-side axle clamp 810. In the embodiment shown in FIG. 4, the first spacer upper portion 204 includes the spacer decreased thickness portion 402 resulting from a decrease in the outer diameter dimension while keeping the inside diameter dimension constant. The spacer decreased thickness portion 402 extends from the top of the first spacer 202 down to a location still within the extent of the non-brake-side cover plate 102 thickness. The transition between first spacer 202 thicknesses results in the first spacer shoulder 400. As shown in FIG. 4, the first spacer shoulder 400 is also coupled to the non-brake-side cover plate 102. The thicker first spacer 202 portion then continues past the non-brake-side axle clamp face 108 of the non-brake-side cover plate 102 and beyond, as determined by the overall length of the first spacer 202.

The decrease in thickness and the resulting first spacer shoulder 400 provides an additional contact surface to prevent the non-brake-side cover plate 102 from sliding down the outer surface of the first spacer 202 when the non-brake-side protective cover assembly 308 is in use and installed on the motorcycle. The first spacer 202 including the spacer decreased thickness portion 402 may be integrally coupled to the non-brake-side cover plate 102 during non-brake-side cover plate 102 formation, or may be demountably coupled to the non-brake-side cover plate 102.

Figure 5:
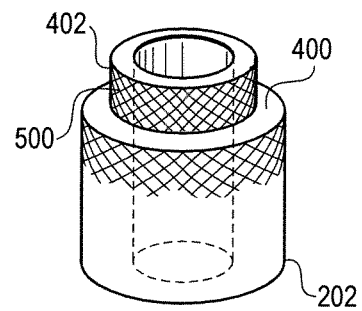
FIG. 5 is a perspective view of the spacer shown in FIG. 4.

Referring next to FIG. 5, a perspective view of the first spacer 202 of FIG. 4 is shown. Shown are the first spacer 202, the spacer decreased thickness portion 402, the first spacer shoulder 400, and a knurled spacer surface area 500.

As previously noted, all description of the first members of the non-brake-side protective cover assembly 308 applies equally to the second members of the non-brake-side protective cover assembly 308.

As described previously in FIG. 4, the first spacer 202 includes the spacer decreased thickness portion 402 and the first spacer shoulder 400 to securely couple the first spacer 202 to the non-brake-side axle clamp 810 during operation of the motorcycle. FIG. 5 additionally shows the optional knurled spacer surface area 500 of the exterior surface of the first spacer 202 in contact with the non-brake-side cover plate 102. The knurled spacer surface area 500 provides further integration of the first spacer 202 with the non-brake-side cover plate 102 for the embodiment where the first spacer 202 is integrally coupled to the non-brake-side cover plate 102 during plate formation.

Figure 6:
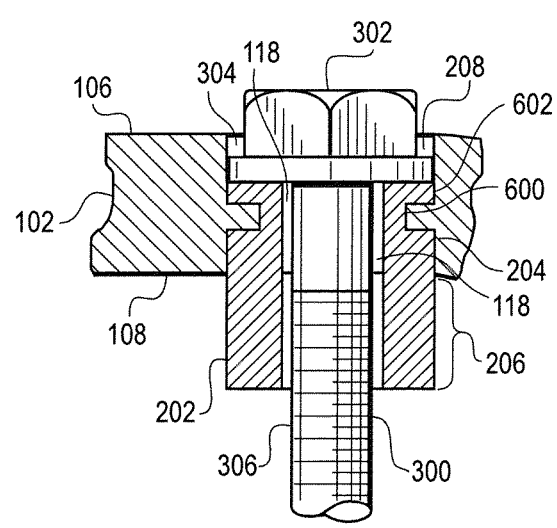
FIG. 6 is a cross-sectional detail view of a further embodiment of the spacer installed as part of the protective cover assembly for the non-brake-side axle clamp of the motorcycle.

Referring next to FIG. 6, a cross-sectional view of the first spacer 202 in an alternate embodiment of the invention is shown. Shown are the non-brake-side cover plate 102, the non-brake-side impact face 106, the non-brake-side axle clamp face 108, the first bolt hole 118, the first spacer 202, the first spacer upper portion 204, the first spacer lower portion 206, the first bolt recess 208, the first bolt 300, the first bolt head 302, the first bolt head flange 304, the first bolt shaft 306, the first spacer shoulder 400, a spacer annular recess 600, and a spacer top flange 602.

As previously noted, all description of the first members of the non-brake-side protective cover assembly 308 applies equally to the second members of the non-brake-side protective cover assembly 308.

In the embodiment shown in FIG. 6, the first spacer 202 thickness is constant except for the spacer annular recess 600 in the exterior face of the first spacer 202, within the upper portion 204 of the first spacer 202.

The spacer annular recess 600 comprises a tubular recess in an outer portion of the first spacer 202. A top edge of the spacer annular recess 600 is located below a top face of the first spacer such that an unrecessed top portion of the first spacer 202 forms the spacer top flange 602. A longitudinal length of the spacer annular recess is configured such that the spacer annular recess remains within the non-brake-side cover plate 102 when the first spacer 202 is coupled to the non-brake-side over plate 102. The spacer annular recess 600 provides additional resistance to pull-out of the first spacer 202 along the first spacer 202 longitudinal axis.

The spacer top flange 602 provides an additional mounting surface for the first bolt head 302, in addition to providing the first spacer shoulder 400 for secure coupling of the first spacer 202 to the non-brake-side cover plate 102 as previously shown in FIG. 4.

Figure 7:
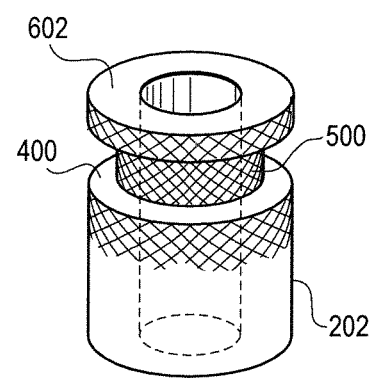
FIG. 7 is a perspective view of the spacer shown in FIG. 6.

Referring next to FIG. 7, a perspective view of the embodiment of the first spacer 202 of FIG. 6 is shown. Shown are the first spacer 202, the first spacer shoulder 400, the spacer decreased thickness portion 402, the knurled spacer surface area 500, the spacer annular recess 600, and the spacer top flange 602.

As previously noted, all description of the first members of the non-brake-side protective cover assembly 308 applies equally to the second members of the non-brake-side protective cover assembly 308.

As described previously in FIG. 6, the first spacer 202 includes the spacer top flange 602, the spacer annular recess 600 and the first spacer shoulder 400 to securely couple the first spacer 202 to the non-brake-side axle clamp 810 during operation of the motorcycle. FIG. 6 additionally shows the optional knurled spacer surface area 500 of the exterior surface of the first spacer 202 in contact with the non-brake-side cover plate 102. As previously noted in FIG. 5, the knurled spacer surface area 500 provides further integration of the first spacer 202 with the non-brake-side cover plate 102 for the embodiment where the first spacer 202 is integrally coupled to the non-brake-side cover plate 102 during non-brake-side cover plate 102 formation.

Figure 8:
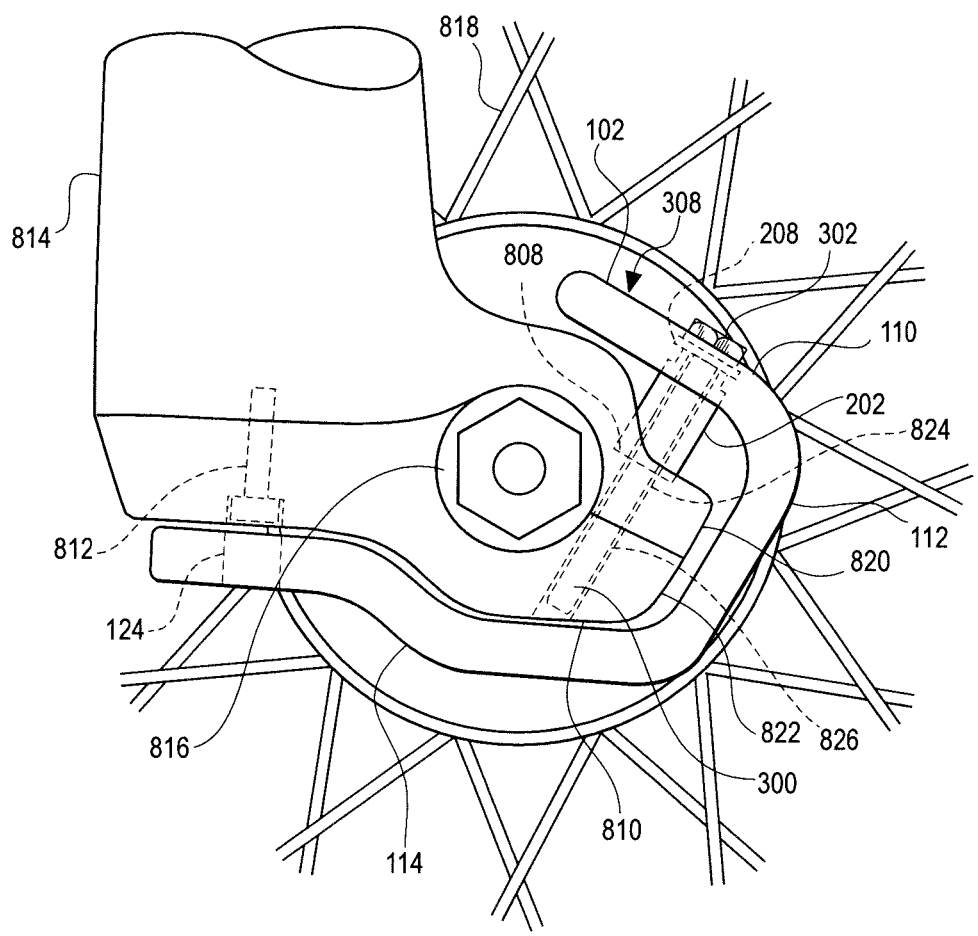
FIG. 8 is a side elevation of the protective cover assembly for the non-brake-side of the motorcycle as installed on the non-brake-side of the axle clamp.

Referring next to FIG. 8, a side elevational view of the non-brake-side protective cover assembly 308 is shown installed on the non-brake-side axle clamp 810 according to one embodiment of the invention. Shown are the non-brake-side axle clamp face 108, the non-brake-side top segment 110, the non-brake-side front segment 112, the non-brake-side bottom segment 114, the non-brake-side first edge 116, the first bolt hole 118, the non-brake-side second edge 122, the non-brake-side access hole 124, the non-brake-side axle clamp face 108, a first spacer 202, a first bolt recess 208, the first bolt 300, the first bolt head 302, the first bolt shaft 306, a first non-brake-side axle clamp recess 808, the compression damping adjustment screw 812, the front fork 814, the wheel axle 816, the front wheel 818, a non-brake-side axle clamp top portion 820, a non-brake-side axle clamp bottom portion 822, a first top pinch bolt hole 824, and a first bottom pinch bolt hole 826.

As previously noted, all description of the first members of the non-brake-side protective cover assembly 308 applies equally to the second members of the non-brake-side protective cover assembly 308.

As previously noted, in the embodiment shown, the motorcycle is a KTM off-road motorcycle. It will be obvious to those skilled in the art that the non-brake-side protective cover assembly 308 may be modified as required to be used with other makes and models of motorcycles.

The non-brake-side axle clamp 810 is shown integrally coupled to the lower end of the front fork 814. The portion of the non-brake-side axle clamp 810 proximate to the front of the motorcycle includes the non-brake-side axle clamp top portion 820 and the non-brake-side axle clamp bottom portion 822. The non-brake-side end of the wheel axle 816 is sandwiched by and thereby coupled to the non-brake-side axle clamp top portion 820 and the non-brake-side axle clamp bottom portion 822.

As described previously in FIG. 3, the non-brake-side cover plate 102 assembly is coupled to the non-brake-side axle clamp 810. The purpose of the non-brake-side axle clamp 810 and a brake-side axle clamp 1116 are to prevent the wheel axle 816 from rotating during use by being compressively tightened around the perimeter of the wheel axle 816. The motorcycle includes a plurality of original pinch bolts (not shown) which threadably couple the non-brake-side axle clamp top portion 820 to the non-brake-side axle clamp bottom portion 822, and a brake-side axle clamp top portion 1100 to a brake-side axle clamp bottom portion 1102 (as shown below in FIG. 11). The non-brake-side axle clamp top portion 820 includes the first and second top pinch bolt holes 824, and the non-brake-side axle clamp bottom portion 822 includes the first and second bottom pinch bolt holes 826 for threadably coupling the first and second original pinch bolts to the non-brake-side axle clamp top portion 820 and the non-brake-side axle clamp bottom portion 822. The brake-side axle clamp top portion 1100 and the brake-side axle clamp bottom portion are coupled in the same manner.

When the first and second original pinch bolts are loosened, the wheel axle 816 may slide relative to the axle clamps 810, 1116 to allow for the wheel 818 removal and maintenance. When the original pinch bolts are coupled to the top and bottom pinch bolt holes 824, 826, and are tightened according to the motorcycle manufacturer's specifications, the wheel axle 816 is compressively sandwiched between the axle clamp top portions 820, 1100 and the axle clamp bottom portions 822, 1102, thus restraining the wheel axle 816 from rotating during motorcycle use.

The non-brake-side protective cover assembly 308 utilizes the pinch bolt fastening system to couple the non-brake-side protective cover assembly 308 to the non-brake-side axle clamp 810 while maintaining the coupling of the non-brake-side axle clamp 810 to the wheel axle 816. The original pinch bolts for the non-disc-brake side of the front fork 814 have been replaced with the first bolt 300 and a second bolt 900 (as shown below in FIG. 9) included in the non-brake-side protective cover assembly 308 as shown in FIG. 3. The length of the first bolt 300 and the second bolt 900 is increased from the length of the original pinch bolts to accommodate the added dimensions of the first spacer 202 and the second spacer and the thickness of the non-brake-side cover plate 102.

The first bolt 300, as previously shown in FIG. 3, passes through the non-brake-side cover plate 102 and first spacer 202, with the first bolt head 302 demountably coupled to the top of the first spacer 202. The first bolt shaft 306 is then threadably coupled to the first top pinch bolt hole 824 and the first bottom pinch bolt hole 826. The first bolt 300 is then tightened according to the motorcycle manufacturer's specifications. When the first bolt 300 has been tightened according to the motorcycle specifications, the first bolt head 302 is compressively coupled to the top of the first spacer 202. The second spacer (not shown) is similarly compressively coupled to the top of the top surface of the non-brake-side axle clamp 810, and the axle is compressively sandwiched between the non-brake-side axle clamp top portion 820 and the non-brake-side axle clamp bottom portion 822.

In the embodiment shown, the top of the non-brake-side axle clamp 810 may include the first and second non-brake-side axle clamp recess 808 for seating the original pinch bolts on the top surface of the non-brake-side axle clamp 810, as previously described in FIG. 3. In the present embodiment, the first and second spacers 202 include an outer diameter sized for fitting snugly within one of the non-brake-side axle clamp recesses 808.

As previously described in FIG. 1, the non-brake-side cover plate 102 includes the non-brake-side access hole 124 for providing access to the compression damping adjustment screw 812 while the non-brake-side cover plate 102 is installed.

Referring again to FIG. 8, the non-brake-side protective cover assembly 308 is shown installed on the non-brake-side axle clamp 810. As previously stated, the non-brake-side protective cover assembly 308 takes advantage of the existence of the top and bottom pinch bolt holes 824, 826 of the non-brake-side axle clamp 810 to attach the non-brake-side protective cover assembly 308 to the non-brake-side axle clamp 810 while maintaining the integrity of the motorcycle.

In the embodiment shown, the installation is simplified by requiring only the two bolts 300, 900 to securely attach the non-brake-side cover plate 102 assembly to the non-brake-side axle clamp 810. In addition, as shown below in FIG. 12, as only the top segment 110 of the non-brake-side cover plate 102 is coupled to the non-brake-side axle clamp 810, the non-brake-side cover plate 102 is capable of movement with respect to the non-brake-side axle clamp 810, as described in more detail below in FIG. 12.

In the embodiment shown, the non-brake-side axle clamp 810 includes the non-brake-side axle clamp recesses 808 at the first and second top pinch bolt holes 824. Those skilled in the art will note that the non-brake-side axle clamp recesses 808 may vary in shape and size among motorcycle manufacturers, or may not be present. The size and bottom profile shape of the spacers 202 may be modified to accommodate the size, shape and availability of the non-brake-side axle clamp recesses 808 and a plurality of brake-side axle clamp recesses 1108.

As previously described in FIG. 1, the shape of the non-brake-side cover plate 102 generally follows the profile of the outer surface of the non-brake-side axle clamp 810, generally covering the top, front, and underside of the non-brake-side axle clamp 810. The exemplary non-brake-side protective cover assembly 308 shown does not include a cover plate segment covering the rear face of the non-brake-side axle clamp 810, for simplicity of manufacturing and due to the infrequency of impact from the rear, but the non-brake-side cover plate 102 may be extended to cover at least a portion of the rear face of the non-brake-side axle clamp 810.

As previously described in FIG. 1, the non-brake-side cover plate 102 includes the non-brake-side access hole 124 for providing access to the compression damping adjustment screw 812 while the non-brake-side cover plate 102 assembly is installed.

Those skilled in the art will recognize that the non-brake-side cover plate 102 may include a wheel guard fin coupled to a wheel side of the non-brake-side cover plate 102 and extending radially outward to protect a portion of the front wheel 818 proximate to the wheel axle 816. Alternately, the non-brake-side cover plate 102 shape may be modified to accommodate the installation of both the non-brake-side protective cover assembly 308 and a separate wheel guard.

Figure 9:
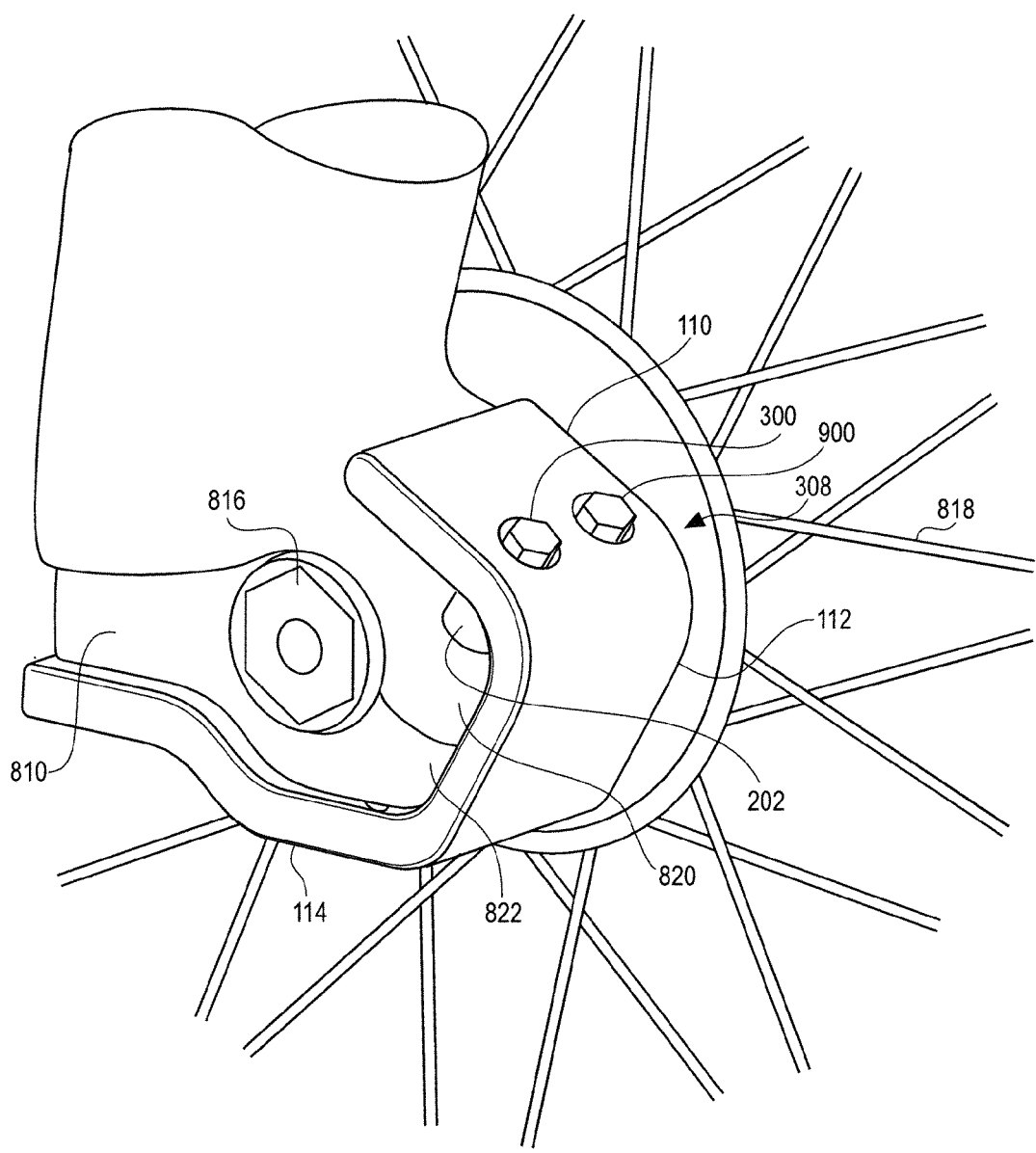
FIG. 9 is a perspective view of the protective cover assembly for the non-brake-side of the motorcycle as installed on the non-brake-side of the axle clamp.

Referring next to FIG. 9, a perspective view of the non-brake-side protective cover assembly 308 is shown installed on the motorcycle in one embodiment of the invention. Shown are the non-brake-side axle clamp face 108, the non-brake-side top segment 110, the non-brake-side front segment 112, the non-brake-side bottom segment 114, the non-brake-side first edge 116, the non-brake-side second edge 122, the non-brake-side axle clamp face 108, the first spacer 202, the first bolt 300, the first bolt head 302, the first bolt shaft 306, the non-brake-side axle clamp top portion 820, the non-brake-side axle clamp bottom portion 822, and the second bolt 900.

FIG. 9 illustrates the installed non-brake-side protective cover assembly 308 as previously described in FIG. 8. FIG. 9 additionally shows the second bolt 900 as installed in the non-brake-side axle clamp 810 as previously described in FIG. 8.

Figure 10:
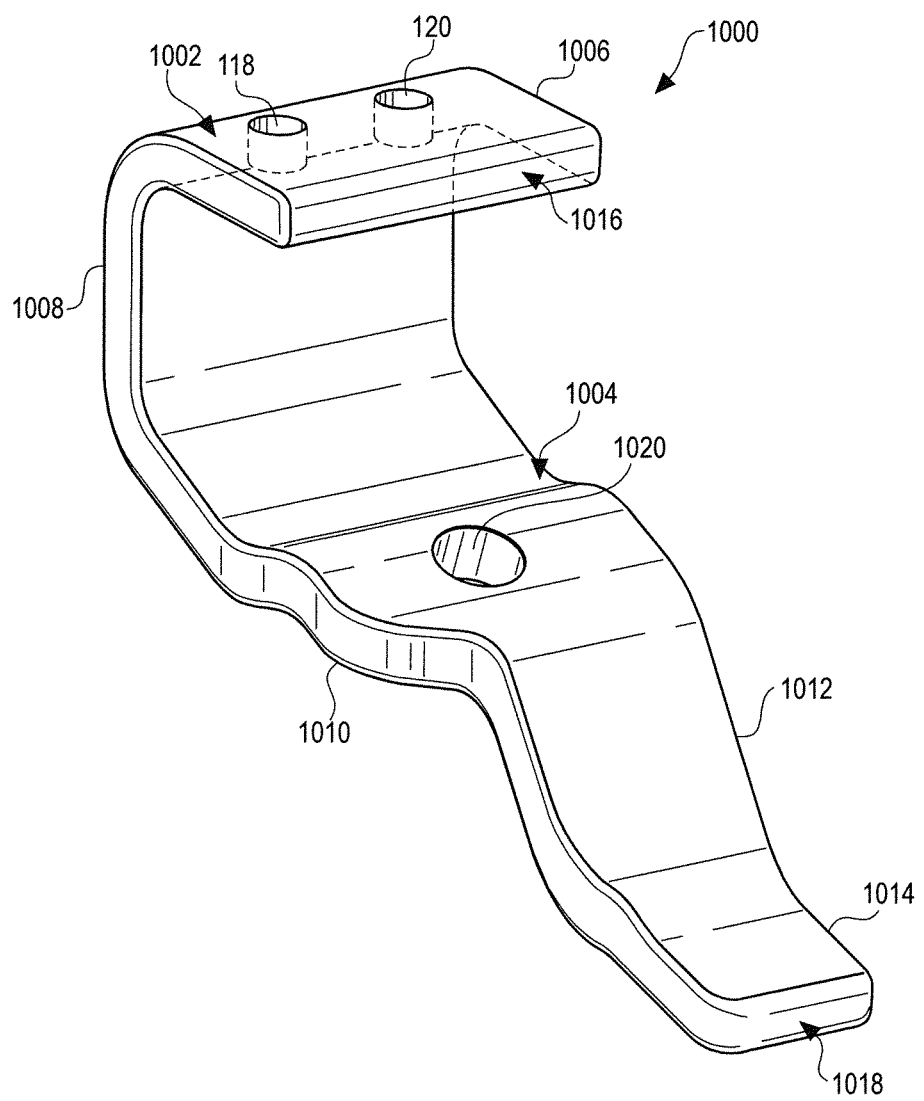
FIG. 10 is a perspective view of a cover plate of the protective cover assembly for a brake-side axle clamp of a motorcycle.

Referring next to FIG. 10, a perspective view of a protective brake-side cover plate 1000 for the motorcycle brake-side axle clamp 1116 is shown. Shown are a brake-side impact face 1002, a brake-side axle clamp face 1004, a brake-side top segment 1006, a brake-side front segment 1008, a brake-side bottom segment 1010, a first brake caliper segment 1012, a second brake caliper segment 1014, a brake-side first edge 1016, the first bolt hole 118, the second bolt hole 120, a brake-side second edge 1018, and a brake-side access hole 1020.

The brake-side cover plate 1000 is of similar composition and shape to the non-brake-side cover plate 102, with the exception of the addition of the first brake caliper segment 1012 and the second brake caliper segment 1014 to the brake-side cover plate 1000. Thus, the brake-side top segment 1006, the brake-side front segment 1008, and the brake-side bottom segment 1010 correspond to the non-brake-side top segment 110, the non-brake-side front segment 112, and the non-brake-side bottom segment 114, respectively. As the brake-side cover plate 1000 is viewed as it would be installed on the brake side of the motorcycle, the brake-side top, front, and bottom segments 1006, 1008, 1010 form a general C-shape, with the brake caliper segments 1012, 1014 extending the bottom of the C-shape to the right. The first brake caliper segment 1012 is coupled to the end of the brake-side bottom segment 1010 distal to the brake-side front segment 1008. The first brake caliper segment 1012 is integrally coupled to the brake-side bottom segment 1010, and the first brake caliper segment 1012 thickness is similar to and aligns with the brake-side bottom segment 1010. The second brake caliper segment 1014 is coupled to the end of the first brake caliper segment 1012 distal to the brake-side front segment 1008.

The shapes and relational angles of the brake-side top segment 1006, brake-side front segment 1008, and brake-side bottom segment 1010 are similar to those of the corresponding non-brake-side segments 110, 112, 114. The shapes and relational angles of the brake-side segments 1006, 1008, 1010 may vary from their corresponding non-brake-side segments 110, 112, 114 due to differences in shape of the brake-side axle clamp 1116 from the non-brake-side axle clamp 810.

The first and second brake caliper segment 1012, 1014 widths nominally follow the width of a brake caliper support 1112, which in the present embodiment has a smaller width than the brake-side axle clamp 1116 (as shown below in FIG. 11). In the embodiment shown, width of the first brake caliper segment 1012 is approximately 31 mm. The width of the second brake caliper segment 1014 is approximately 25 mm. The decrease in width occurs at the first and second brake caliper segment 1012, 1014 sides distal to the motorcycle front wheel 818.

The first brake caliper segment 1012 is integrally coupled to the end of the brake-side bottom segment 1010 distal to the brake-side front segment 1008. The brake-side axle face 1004 of the first brake caliper segment 1012 meets the brake-side axle face 1004 of the brake-side bottom segment 1010 at an angle to generally conform to an outer surface of the brake caliper support 1112, and the length of the first brake caliper segment 1012 is approximately 47 mm. The end of the first brake caliper segment 1012 distal to the brake-side front segment 1008 is integrally coupled to the second brake caliper segment 1014. The brake-side axle clamp face 1004 of the second brake caliper segment 1014 intersects the brake-side axle clamp face 1004 of the first brake caliper segment 1012 at an angle to generally conform to the outer surface of the brake caliper support 1112.

The non-brake-side front segment 112 is integrally coupled to the non-brake-side top segment 110 at an approximately right angle to the non-brake-side top segment 110, the actual angle matching the change in direction of the non-brake-side axle clamp 810 surface, with the non-brake-side front segment 112 extending downward from the non-brake-side top segment 110.

Referring again to FIG. 10, in the exemplary embodiment, the brake-side axle clamp 1116 is integrally coupled to the brake caliper support 1112 located at the rear end of the brake-side axle clamp 1116. The non-brake-side protective cover assembly 308 may also be used on the brake-side axle clamp 1116, if the added protection of the brake caliper support 1112 is not desired, and the design of the motorcycle permits the non-brake-side protective cover assembly 308 to be installed and function properly when installed on the brake-side axle clamp 1116. It should also be noted that, dependent on the motorcycle geometry, the brake-side protective cover assembly 1114 may be able to be installed and function properly when installed on the non-brake-side axle clamp 810.

The first brake caliper segment 1012 and the second brake caliper segment 1014 are added to the brake-side front, top and bottom segments 1006, 1008, 1010 to additionally cover and protect the brake caliper support 1112 (as shown below in FIG. 11). Due to the shape and configuration of the brake caliper support 1112, as shown below in FIG. 11, the first brake caliper segment 1012 and the second brake caliper segment 1014 are coupled to the adjacent segments in a shape to follow the underside of the brake caliper support 1112 when a brake-side protective cover assembly 1114 is installed on the brake-side axle clamp 1116.

As, in the present embodiment, the width of the brake caliper support 1112 is narrower than the adjacent portion of the brake-side axle clamp 1116, the width of the first and second brake caliper segments 1012, 1014 are also narrower than the adjacent brake-side cover plate 1000 segment, in order to conform to the brake caliper support 1112 width. Those skilled in the art will note that alternately the width of the axle clamp segments 1006, 1008, 1010 may be maintained for the brake caliper segments 1012, 1014 and not decreased.

Figure 11:
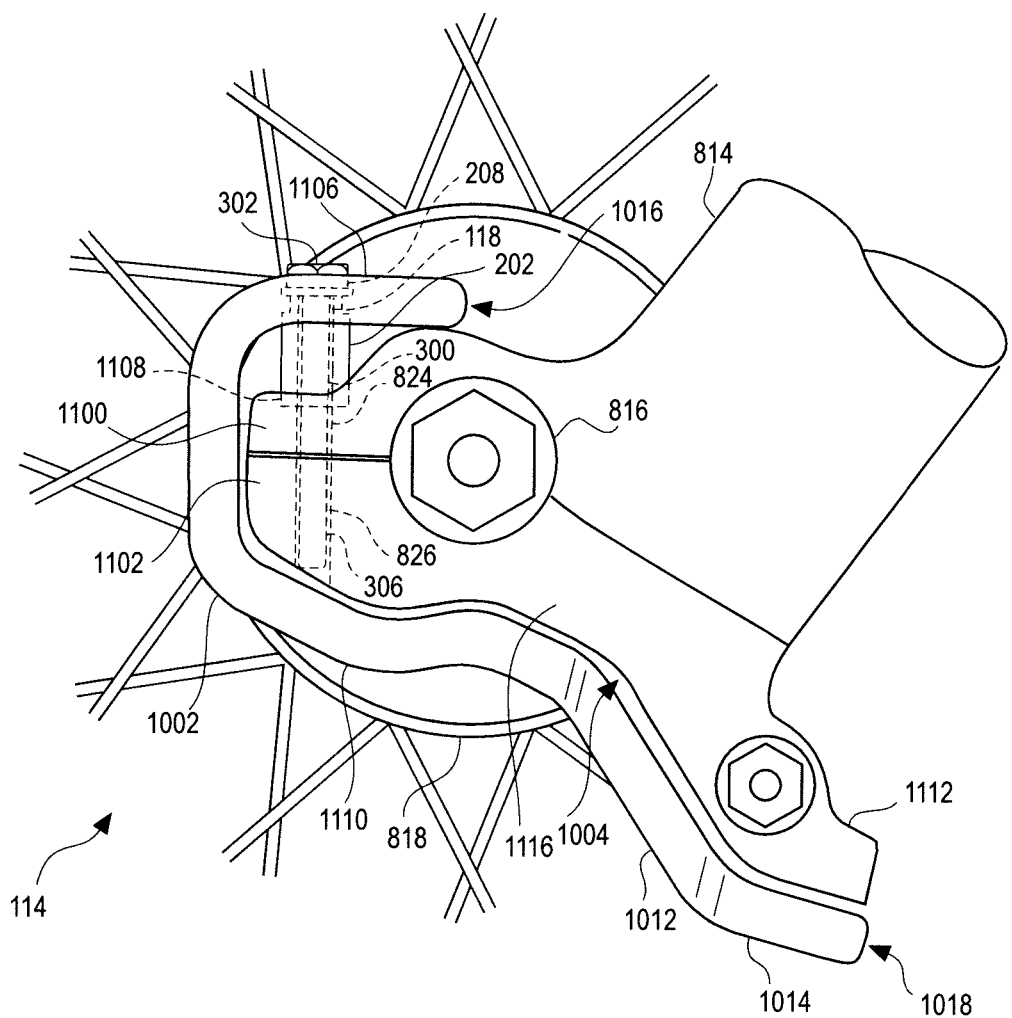
FIG. 11 is a side elevation of the protective cover assembly for the brake-side of the motorcycle as installed on the brake-side of the axle clamp.

Referring next to FIG. 11, a side elevational view of the brake-side protective cover assembly 1114 is shown installed on the motorcycle in one embodiment of the invention. Shown are the brake-side cover plate 1000, the brake-side impact face 1002, the brake-side axle clamp face 1004, the brake-side top segment 1006, the brake-side front segment 1008, the brake-side bottom segment 1010, the first brake caliper segment 1012, the second brake caliper segment 1014, the brake-side first edge 1016, the first bolt hole 118, the brake-side second edge 1018, the first spacer 202, the first bolt recess 208, the first bolt 300, the first bolt head 302, the first bolt shaft 306, the wheel axle 816, the front wheel 818, the brake-side axle clamp top portion 1100, the brake-side axle clamp bottom portion 1102, the first brake-side axle clamp recess 1108, the front fork 814, the brake caliper support 1112, and the brake-side axle clamp 1116.

The brake-side protective cover assembly 1114 is installed similarly to the non-brake-side protective cover assembly 308 as previously described in FIG. 8. As previously shown, the first and second bolts 300, 900 pass through the first and second bolt holes 118, 120 in the brake-side cover plate 1000 and through the first and second spacers 202, and are threadably coupled to the brake-side axle clamp 1116.

FIG. 11 illustrates the relation of the first and second brake caliper segments 1012, 1014 on the brake-side cover plate 1012 to the front brake caliper support 1112. The brake caliper segments 1012, 1014 extend underneath the brake caliper support 1112, so that the brake-side cover plate 1000 protects the brake caliper support 1112 in addition to protecting the brake-side axle clamp 1116.

Figure 12:
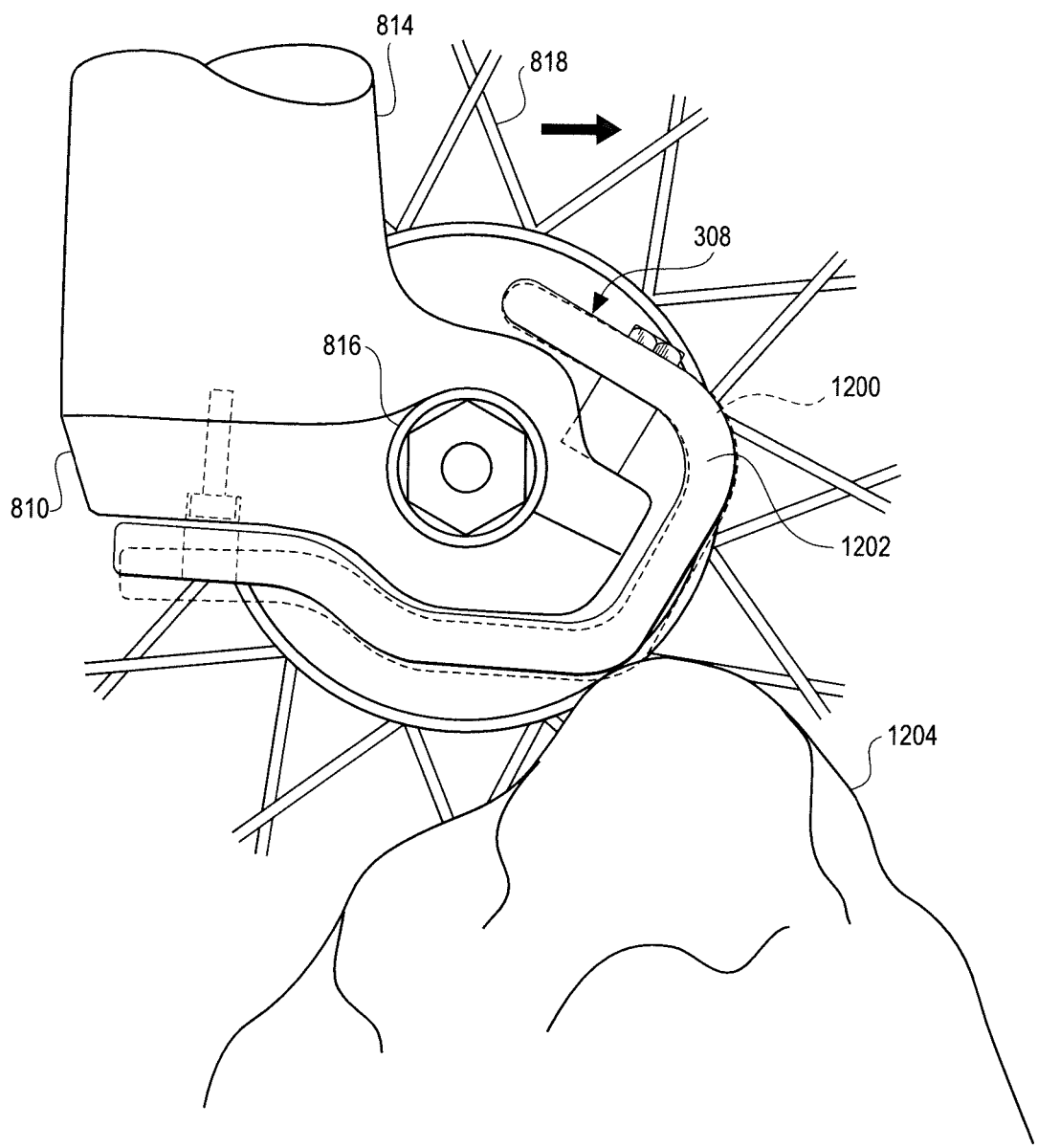
FIG. 12 is a schematic diagram of the protective cover assembly in use on the motorcycle.

Referring next to FIG. 12, a schematic diagram of the non-brake-side protective cover assembly 308 in operation is shown. Shown are the non-brake-side protective cover assembly 308, the non-brake-side axle clamp 810, the front fork 814, the wheel axle 816, the front wheel 818, an original position 1200, an impact position 1202, and an impact object 1204.

For clarity, the non-brake-side protective cover assembly 308 is shown, but those of ordinary skill in the art will note that the operation of the brake-side protective cover assembly 1114 is the same as for the non-brake-side protective cover assembly 308.

The original position 1200 is defined as the position of the protective cover as installed and before impact with the impact object 1204, as shown previously and shown as a dashed line in FIG. 12.

When the non-brake-side protective cover assembly 308 is impacted by the impact object 1204, the non-brake-side cover plate 102 flexes and rotates in a direction generally towards the rear of the motorcycle, with the rotational center at the bolt connections. In the case of an impact transferring a small impact force to the non-brake-side cover plate 102, the non-brake-side cover plate 102 may flex without coming in contact with the underside of the non-brake-side axle clamp 810. In the case of a larger impact, for example the impact object 1204 is a boulder as shown in FIG. 12, the flexing of the non-brake-side cover plate 102 will result in the non-brake-side cover plate 102 coming in contact with the underside of the non-brake-side axle clamp 810, as shown by the impact position 1202. The thickness of the non-brake-side cover plate 102 transfers the impact forces over a larger area of the non-brake-side axle clamp 810, reducing the impact stress applied to the non-brake-side axle clamp 810. In addition, the non-brake-side cover plate 102 contacts the non-brake-side axle clamp 810 over a larger area as compared to the impact area of the non-brake-side cover plate 102, further reducing the impact stress on the non-brake-side axle clamp 810. The reduction in impact stress reduces or eliminates damage to the non-brake-side axle clamp 810 (and the brake caliper support 1112, as applicable).

In addition, the smooth impact face profile of the non-brake-side cover plate 102 allows the non-brake-side cover plate 102 to slide over the impact object 1204 instead of resulting in a point impact, further reducing the chance for damage to the brake-side axle clamp 1116 or the non-brake-side axle clamp 810 and the brake caliper support 1112.

While the invention herein disclosed has been described by means of specific embodiments, examples and applications thereof, numerous modifications and variations could be made thereto by those skilled in the art without departing from the scope of the invention set forth in the claims.

What is claimed is:

1. A protective cover system for an axle clamp, wherein the axle clamp is coupled to a front fork of a motorcycle, comprising:
    a cover plate shaped to cover and conform to at least a portion of an axle clamp outer surface, the axle clamp having a first pinch bolt hole and a second pinch bolt hole, the axle clamp outer surface portion located generally perpendicular to a motorcycle front wheel, the cover plate including an impact face facing outward from the axle clamp when the cover plate is coupled to the axle clamp,
    the cover plate having a first bolt hole located so that when the cover plate is coupled to the axle clamp, the first bolt hole is concentric to the first pinch bolt hole,
    the cover plate having a second bolt hole located so that when the cover plate is coupled to the axle clamp, the second bolt hole is concentric to the second pinch bolt hole,
    the cover plate comprising a resilient and flexible material,
    the cover plate including a cover plate width generally equal to an axle clamp width of the axle clamp in a direction generally perpendicular to the motorcycle front wheel when the cover plate is coupled to the axle clamp,
    the cover plate including a thickness configured for resisting breakage of the cover plate and protecting the axle clamp from damage when the cover plate sustains impact during use of the motorcycle,
    a first spacer, of generally cylindrical shape, and comprising a rigid material, with a first spacer longitudinal axis coinciding with a first bolt hole longitudinal axis, a first spacer upper portion extending through at least a portion of the first bolt hole and coupled to the cover plate, whereby a cover plate interior face at the first spacer is separated from an axle clamp outer face when the first spacer is coupled to the axle clamp at the first pinch bolt hole;
    a second spacer, of generally cylindrical shape, and comprising a rigid material, with a second spacer longitudinal axis coinciding with a second bolt hole longitudinal axis, a second spacer upper portion extending through at least a portion of the second bolt hole and coupled to the cover plate, at the second hole location, whereby the cover plate interior face at the second spacer is separated from the axle clamp outer face when the second spacer is coupled to the axle clamp at the second pinch bolt hole;
    a first bolt including a first bolt head and a threaded first bolt shaft, the first bolt shaft passing through the cover plate at the first bolt hole, the first spacer, and the first pinch bolt hole, wherein the first bolt head is mounted on a first spacer end proximate to the impact face of the cover plate, and the first bolt is threadably coupled to a first axle clamp top pinch bolt hole and a first axle clamp bottom pinch bolt hole;
    a second bolt including a second bolt head and a threaded second bolt shaft passing through the cover plate at the second bolt hole, the second spacer, and the second pinch bolt hole, wherein the second bolt head is mounted on a second spacer end proximate to the impact face of the cover plate, and the second bolt is threadably coupled to a second axle clamp top pinch bolt hole and a second axle clamp bottom pinch bolt hole,
    whereby the cover plate is coupled to the axle clamp so that the impact face is adjacent to the axle clamp outer surface, whereby the cover plate sustains an impact and flexes to absorb the impact and contact the axle clamp to distribute the impact over an axle clamp contact surface, whereby impact damage to the axle clamp is reduced.

2. The protective cover system for the axle clamp according to claim 1, wherein the first spacer includes a first flange at the first spacer end proximate to the impact face and the second spacer includes a second flange at the second spacer end proximate to the impact face.

3. The protective cover system for the axle clamp according to claim 1, wherein the first spacer includes a first annular notch in a first spacer outer face portion coupled to the cover plate and the second spacer includes a second annular notch in a second spacer outer face portion coupled to the cover plate.

4. The protective cover system for the axle clamp according to claim 3, wherein the first annular notch extends to the first spacer end proximate to the impact face and the second annular notch extends to the second spacer end proximate to the impact face.

5. The protective cover system for the axle clamp according to claim 1, including an access hole located and configured to provide access to a motorcycle compression damping adjustment when the cover plate is coupled to the axle clamp.

6. The protective cover system for the axle clamp according to claim 1, wherein the cover plate covers a front disc brake support underside.

7. The protective cover system for the axle clamp according to claim 6, wherein the cover plate width varies to match a front disc support width of the front disc brake support underside.

8. The protective cover system for the axle clamp according to claim 1, wherein the impact face includes a first annular recess at the first bolt hole and a second annular recess at the second bolt hole, whereby the first bolt head is snugly mounted in the first annular recess and the second bolt head is snugly mounted in the second annular recess when the cover plate is coupled to the axle clamp.

9. The protective cover system for the axle clamp according to claim 1, wherein the axle clamp includes a first bolt head recess and a second bolt head recess, and wherein a first spacer end proximate to the axle clamp includes an outer diameter equal to the first bolt head recess, and wherein a second spacer end proximate to the axle clamp includes an outer diameter equal to the second bolt head recess, whereby the first spacer is snugly mounted in the first bolt head recess and the second spacer is snugly mounted in the second bolt head recess.

\* \* \* \* \*